US011499689B1

United States Patent
Munoz Ledo Espinosa et al.

(10) Patent No.: US 11,499,689 B1
(45) Date of Patent: Nov. 15, 2022

(54) LIGHT SYSTEM INCLUDING A PLURALITY OF PRINTED CIRCUIT BOARDS HAVING MULTIPLE FUNCTIONS

(71) Applicant: Valeo North America, Inc., Troy, MI (US)

(72) Inventors: Guilebaldo Munoz Ledo Espinosa, Auburn Hills, MI (US); Sergio Aguirre Contreras, Auburn Hills, MI (US); Diana Cuellar Alcala, Auburn Hills, MI (US); Mark Singleton, Auburn Hills, MI (US); Damien Cabanne, Auburn Hills, MI (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 17/360,150

(22) Filed: Jun. 28, 2021

(51) Int. Cl.
*F21S 41/24* (2018.01)
*F21S 41/19* (2018.01)
*F21S 43/19* (2018.01)
*F21S 43/236* (2018.01)
*F21Y 113/10* (2016.01)

(52) U.S. Cl.
CPC ............... *F21S 41/24* (2018.01); *F21S 41/19* (2018.01); *F21S 43/19* (2018.01); *F21S 43/236* (2018.01); *F21Y 2113/10* (2016.08)

(58) Field of Classification Search
CPC ................................ F21S 43/249; F21S 41/24
See application file for complete search history.

(56) References Cited

U.S. PATENT DOCUMENTS

| | | | |
|---|---|---|---|
| 9,261,253 B2 * | 2/2016 | Mochizuki | F21S 41/295 |
| 9,726,809 B2 * | 8/2017 | Sato | F21S 43/15 |
| 9,939,125 B2 * | 4/2018 | Donato | F21V 5/007 |
| 10,436,403 B2 | 10/2019 | Warner et al. | |
| 10,488,007 B2 | 11/2019 | Mayer et al. | |
| 10,542,632 B2 | 1/2020 | Kim et al. | |
| 10,641,458 B2 * | 5/2020 | Xiang | F21S 43/26 |
| 10,730,430 B2 * | 8/2020 | Williams | F21S 43/27 |
| 10,920,950 B1 * | 2/2021 | Glickman | F21S 41/285 |
| 11,320,111 B2 * | 5/2022 | Muegge | F21S 43/235 |
| 2006/0203486 A1 * | 9/2006 | Lee | G02B 27/0994 362/244 |
| 2014/0160779 A1 * | 6/2014 | Pusch | F21S 43/239 362/511 |
| 2016/0252226 A1 * | 9/2016 | Shih | F21S 43/239 362/511 |
| 2020/0300436 A1 * | 9/2020 | Paroni | F21S 43/243 |

* cited by examiner

*Primary Examiner* — Matthew J. Peerce
(74) *Attorney, Agent, or Firm* — Young Basile Hanlon & MacFarlane, P.C.

(57) ABSTRACT

A light system comprising: (a) a plurality of printed circuit boards; (b) a plurality of sets of light sources on each of the plurality of printed circuit boards that are configured to provide a different lighting function, wherein each of the plurality of sets of light sources include one or more light source that generates light; (c) a plurality of light bars that distribute the light from each of the plurality of sets of light sources; and (d) one or more light guides on each of the plurality of light bars, wherein each of the one or more light guides is aligned with one or more of the one or more light sources so that the light passes from the one or more light sources into one of the one or more light guides and into one of the plurality of light bars to provide one of the different lighting functions.

19 Claims, 7 Drawing Sheets

LIGHT SYSTEM INCLUDING A PLURALITY OF PRINTED CIRCUIT BOARDS HAVING MULTIPLE FUNCTIONS

FIELD

The present teachings relate to a light system providing two or more lighting functions with the two or more lighting functions each being provided on each of the plurality of printed circuit boards.

BACKGROUND

Vehicles include many different types of lights. Some types of lights included on a vehicle are low beam headlights, high beam headlights, tail lights, turn signal lights, fog lights, running lights, or a combination thereof. Each of these lights extend out of an outer surface of a vehicle so that they provide light for the driver or provide notice of surrounding drivers. Each of these lights require a space to function and provide light. However, as more lights, longer lights, or both are provided there is less room for each of these lighting systems.

Examples of light systems may be disclosed in U.S. Pat. Nos. 10,436,403 and 10,488,007 both of which are expressly incorporated herein by reference for all purposes. Thus, there is a need for a light system where the light system includes two or more circuit boards and each circuit board provides two or more lighting functions. There is a need for a system where the circuit boards provide two or more different light sources and each light source produces a different type of light within the lighting system. It would be desirable to have a plurality of circuit boards located end to end relative to one another that all work in tandem to produce two or more lights. There is a need for a system where each of the circuit boards produce two or more different lighting effects and each of the two or more lighting effects can work simultaneously, intermittently, alternatively, or a combination thereof. It would be desirable to have a light system with an extended length where light is input into the light system substantially along the entire length.

SUMMARY

The present teachings provide: A light system comprising: (a) a plurality of printed circuit boards; (b) a plurality of sets of light sources on each of the plurality of printed circuit boards that are configured to provide a different lighting function, wherein each of the plurality of sets of light sources include one or more light source that generates light; (c) a plurality of light bars that distribute the light from each of the plurality of sets of light sources; and (d) one or more light guides on each of the plurality of light bars, wherein each of the one or more light guides is aligned with one or more of the one or more light sources so that the light passes from the one or more light sources into one of the one or more light guides and into one of the plurality of light bars to provide one of the different lighting functions.

A light system comprising: (a) two or more printed circuit boards that are located within the light system substantially end to end with one another; (b) two or more of sets of light sources on each of the two or more printed circuit boards that are configured to provide a light that is a different color light or a different wavelength of light, each of the two or more sets of light sources includes: (i) one or more light source that generate the light; (c) two or more light bars that distribute the light, wherein the two or more light bars are located within substantially parallel planes; (d) one or more light guides extending from each of the two or more light bars to receive light from one of the one or more light sources; (e) a blocker located between the two or more light bars that prevents light from the two or more light bars from extending therebetween; and (f) one or more controllers that control the two or more sets of light sources.

A light system comprising: (a) two or more printed circuit boards that are located within the light system substantially end to end with one another; (b) two or more of sets of light sources on each of the two or more printed circuit boards that are configured to provide a light that is a different color light or a different wavelength of light, each of the two or more sets of light sources includes: (i) one or more light source that generate the light; (c) two or more light aiming devices that distribute the light, wherein the two or more light aiming devices have a substantially similar shape; (d) one or more locators that align each of the two or more printed circuit boards relative to one or both of the two or more light aiming devices; and (d) one or more locator recesses that receive one of the one or more locators and align one of the one or more printed circuit boards to one or more of the two or more light aiming devices.

The present teachings provide a light system where the light system includes two or more circuit boards and each circuit board provides two or more lighting functions. The present teachings provide a system where the circuit boards provide two or more different light sources and each light source produces a different type of light within the lighting system. The present teachings provide a plurality of circuit boards located end to end relative to one another that all work in tandem to produce two or more lights. The present teachings provide a system where each of the circuit boards produce two or more different lighting effects and each of the two or more lighting effects can work simultaneously, intermittently, alternatively, or a combination thereof. The present teachings provide a light system with an extended length where light is input into the light system substantially along the entire length.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project in a forward direction, rear direction, side direction, or a combination thereof. Preferably, the light system projects a light from an external surface of the vehicle to a location in front of the vehicle or at an angle relative to the front of a vehicle. The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light systems may be multiple light systems stacked one above the other or integrated into a single light system. The light of the vehicle may be two or more, three or more, or four or more light systems located one above another. A total height of the light systems may be decreased by placing all of the light sources in a single plane or on a same plane.

The light sources function to produce light. The light source may be a device or a plurality of devices that create light and the light extends outward from the light source. The light source may produce a high beam, a low beam, a blending beam, a running light, a day time light, a turn signal, a brake light, or a combination thereof. The light source may be aimed for near light, far light, blending light that blends the far light and near light together, or a combination thereof. The light sources may have different functions. For example, one light source may provide a running light and another light source may be a turn signal or fog light. The light source may comprise a plurality of lights or may be a single light source within a set of light sources. The plurality of lights may be in one set or group of light sources. The light source may be a single light that projects light. In another example, a single light source may direct light to a first location (e.g., a first light guide). The light source may be directional light. The light source may have an emission that is a Lambertian emission or a narrow emission angle. The directional light source may concentrate light on a light guide, towards a light bar, or both. The light source may include a laser diode, glowing phosphor, filament bulb, a light emitting diode, a halogenated light, an xenon light, or a combination thereof. The light source may create a cone of light with an optical axis. The optical axis may be directed at a light guide. Preferably, the optical axis of each light source is located substantially within a center of a light guide (e.g., within about 1 mm or less, about 0.1 mm or less, or about 0.001 mm or less of the center). For example, the light source may produce light having a cone that extends at 60 degrees on each side of the optical axis and substantially all of the cone will be received by the light guides. The angle of the light from the light source may form different angles with the light guides due to a shape or spacing between the light guide and the light source.

The light source may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light source may be a single lamp or bulb. Preferably, the light source is part of a set of light sources that includes a plurality of lamps, bulbs, diodes, or a combination thereof. The light source may be part of a set of light sources that includes two or more, 3 or more, 4 or more, or 5 more light sources that produce light and combine together to form the light extending from the light system. The sets of light source may include 50 or less, 35 or less, 20 or less, or 15 or less devices that produce light (e.g., each set may include 5 light sources or alternatively all of the sets when combined together may include 5 light sources). For example, the set of light sources may be the contents of a single printed circuit board that perform a same lighting function and the set of light sources may be 5 light sources. The set of light sources may be all of the light sources on all of the printed circuit boards that create a same lighting function and may be 15 light sources. For example, there may be 30 total light sources, but only 15 perform a same function and those may be a set of light sources. The light source may be static. The light sources may be free of movement. The light source may be fixed. The light sources may be static and may be manually or physically adjusted so that the light sources are directed to a desired location. The light sources may be fixed and the light from the light source may be moved, bent, directed, or a combination thereof by optical elements or reflectors (e.g., a light guide). Each device of the light source may be turned on and off. The light source may be located within a light system at a location relative to a light guide. Each light guide may receive light from a single light source. The light sources may work together as a set of light sources to create light.

The set of light sources function to fill a light bar with light so that the light bar projects light outward to perform some function. The set of light sources may be a single function (e.g., a high beam, a low beam, a blending beam, a running light, a day time light, a turn signal, a brake light, or a combination thereof). Each set of light sources may perform a single function. The light system may include two or more sets of light sources, three or more sets of light sources, or even four or more sets of light sources. Each of the sets of light sources may perform a different function or provide a different type of light. All of the lights within a set of light sources may provide the same light (e.g., color, color temperature, or wavelength). For example, one set of light sources may be yellow, orange, or red and a second set of light sources may be white (e.g., OEM white, off white, pure white, or crystal white (e.g., having a color temperature between 4300K and 6000K). The color, intensity, temperature, or a combination thereof may vary from set to set depending on the function of the set of light sources. For example, if one set of light sources is directed to a turn signal then the color may be orange whereas if the set of light sources is for a brake light then the color may be red. The light from the light system may be directed to a predetermined location depending on a function of the light from that set of light sources. For example, a running light may be directed outward in front of a vehicle whereas a turn signal may be directed at a 45 degree angle so that a portion of the light is visible in a front of the vehicle and a portion of the light is visible from a side of the vehicle.

Each of the set of light sources may direct light on a first side and a second side of an optical axis. Some of the light may extend on an inboard side of the optical axis (e.g., in a direction towards a center of a vehicle). Some of the light may extend on an outboard side of the optical axis (e.g., in a direction away from a center of a vehicle). The light may extend farther on an outboard side than an inboard side of a light. The light on the inboard side may illuminate a region between two light sources and in front of a vehicle. A right-handed light and a left-handed light may each include light that extends inboard (e.g., on an inboard side) so that the inboard lights overlap and illuminate in front of a vehicle. A right-handed light and a left-handed light may each include light that extends outboard (e.g., on an outboard side) of a vehicle so that the outboard light illuminates a region outside of the vehicle, sides of a road, or both. The light from each of the light sources may extend outward from the light source at an angle towards an inboard side and an outboard side. The light extending on the inboard side may extend outward from the light source, vehicle, or both at an angle of about 10 degrees or more, about 20 degrees or more, about 25 degrees or more, or about 30 degrees or more relative to the optical axis. The light extending on the inboard side may extend outward from the light source, the vehicle, or about at an angle of about 50 degrees or less, about 40 degrees or less, or about 35 degrees or less relative to the optical axis. The light extending on the outboard side may extend outward from the light source, vehicle, or both at an angle of about 20 degrees or more, about 30 degrees or more, about 35 degrees or more, or about 40 degrees or more relative to the optical axis. The light extending on the outboard side may extend outward from the light source, the vehicle, or about at an angle of about 60 degrees or less, about 50 degrees or less, or about 45 degrees or less relative to an optical axis. An angle the light extends on an inboard side and an outboard side of the optical axis may be varied based on a shape of a reflector. The light may be generated by the light sources and be directed into one or more light aiming devices.

The light aiming devices function to direct light from the light sources to a predetermined location. The light aiming devices may turn the light from a first direction to a second direction. The light aiming devices may spread the light, magnify the light, intensify the light, disburse the light, focus the light, or a combination thereof. The light aiming devices may receive and direct only one type of light. Each light aiming device may collect and aim light from one light source or one set or row of light sources. The light aiming devices may be reflective, transparent, partially reflective, partially transparent, collimate light, or a combination thereof. The light system may include two or more, three or more, four or more, or even five or more light aiming devices. The light aiming devices may partially overlap. A portion of each light aiming device may not be covered by another light aiming device so that the light aiming device may receive light from the light source and direct the light.

The directed light functions to extend out of the light system in a predetermined direction. The directed light may be directed to a road surface, above a road surface, parallel to a road surface, along a side, in a direction of motion, opposite a direction or motion, or a combination thereof of a vehicle. The directed light may be directed by a light bar, a reflector, or a combination of both.

The reflector functions to change a direction of light from a first direction to a second direction, to illuminate a predetermined region, or both. The reflector may be a curved material that redirects light from a light source in a direction as directed light. The reflector may be flat, concave, convex, curved, dished, or a combination thereof. The reflector may directly receive light from the light source. The reflector may be a polymer covered with reflective material. The reflector may be a polycarbonate material covered with aluminum. The reflector may be used with other reflectors, with light bars, or a combination of both.

The light guide may function to receive light from a light source, direct light from a light source to a light bar, or both. The light guide may be a substantially transparent piece of material. The light guide may direct light to a predetermined direction or in a predetermined location. The light guide may direct light in substantially every direction. The light guide may magnify light, intensify light, diffuse light, aim light, direct light, spread light, act as a lens, or a combination thereof. The light guide may glow. The light guide may direct light from a first direction to a second direction. The light guide may collect light from a light source and guide the light into a light bar. Each light source may be located adjacent to or directed at one light guide. The light guide may be located a predetermined distance from a light source. Thus, the light guide may have a height above the light bar. The height of the light guide may be a distance from a base of the light bar to a light receiving portion of the light guide. The height of the light guide may vary depending on if the light bar is a top light bar, a middle light bar, or a bottom light bar. The height of the light guides may be varied so that a light receiving portion of all of the light guides is substantially coplanar. The height of the light guides may be about 1 mm or more, about 3 mm or more, about 5 mm or more, about 7 mm or more, or about 1 cm or more. The height of the light guides may be 10 cm or less, 7 cm or less, 5 cm or less, or 3 cm or less. The light receiving portion of the light guide may be flat, concave, convex, or a combination thereof. The light receiving portion may extend downward and connect with the light bar. The light receiving portion may extend in any direction towards a light or a light bar so that the light receiving portion receives and distributes light (e.g., up, down, left, right, upside down, right-side up, sideways). The light guide and the light bar may be one monolithic piece.

The light bar functions to distribute light, direct light to a predetermined location, spread light, illuminate a region of interest, or a combination thereof. The light bar may be made of a transparent material. The light bar may transmit the light out of the light system. The light bar may combine light from multiple light sources. The light bar may be substantially planar. One light bar may be located above, over, and coplanar with one or more other light bars. The light bars may be an upper light bar and a lower light bar.

The lower light bar functions to provide lighting or provide one type of lighting outside of a vehicle. The lower light bar may be located proximate to a lower cover. The lower light bar may rest directly on or in the lower cover. The lower light bar may be located below a reflector, above a reflector, or both. The lower light bar may be in direct contact with the lower cover. The lower light bar may be connected to the lower cover. The lower light bar may be free of a direct connection with the lower cover. The lower cover may include a mating surface that is complementary in shape to the lower light bar. The lower cover may include one or more alignment posts that extend into or through the lower cover. The lower light bar may align all of the other components of the light system (e.g., the printed circuit board, blocker, upper light bar). The lower light bar may be aligned with the lower cover and the light blocker, the upper light bar, or both may be aligned with the lower light bar.

The upper light bar functions to provide lighting or provide one type of lighting outside of a vehicle. The upper light bar may provide a different lighting than the lower light bar. The upper light bar may be free of a direct connection with the lower light bar, the blocker, the printed circuit board, or a combination thereof. The upper light bar may be sandwiched between the printed circuit board and the blocker, the lower light bar, or both. The upper light bar may be free of any fasteners. The upper light bar may have a complementary fit with the blocker. The upper light bar may extend coplanar with the lower light bar. The upper light bar may be aligned relative to the lower light bar.

Each light bar (e.g., upper light bar, lower light bar, middle light bars) may have a length (e.g., major dimension). The length of each of the light bars may be substantially equal. The light bars may have a length that is substantially a same as a length of the light system. The length may be about 40 cm or more, about 50 cm or more, about 60 cm or more, or about 70 cm or more. The length may be about 200 cm or less, about 150 cm or less, about 100 cm or less, or about 80 cm or less. Ends of each of the plurality of light bars may begin substantially at a same location and end at substantially a same location (e.g., within about ±2 cm or less or about ±1 cm or less). The light bars may have a shape along a length that is straight, arcuate, curved, wavy, a smooth edge, a jagged edge, a "U" shape, a "V" shape, an apex, or a combination thereof. The light bars may each have a width. A width from light bar to light bar may vary. The light bar in a width direction (e.g., minor direction) may extend from a first side to a second side. One light bar may extend beyond another light bar on a first side, a second side, or both. For example, as the light bars are located closer to the light sources than an adjacent light bar a width of the light source is decreased. The width may be decreased so that light may be directed from a light source into the light bar. The width may be decreased so that a light guide may extend from a second light bar past a first light bar to a location proximate to a light source. An aperture or recess may be present in a second light bar so that a light guide may pass from a location below a first light to a location adjacent to a light source. The aperture may be a hole within a light bar. The aperture or recess may be a finger or cut out that extends inward from an edge to create a void that a light guide may extend through. All or a portion of a light bar may be coated or covered. The coating or covering may prevent light from exiting the light bar at a location other than a desired location. The coating or covering (e.g., blocker) may be located over the body portion, the light guide, or both. The light bar may have a body portion and a light emitting portion.

The body portion functions to transport light in a horizontal direction, connect the light bar within a light system, transport light to a light emitting portion, extend within a plane, or a combat ion thereof. The body portion may be sandwiched between printed circuit board and a blocker, a blocker and a second blocker, a blocker and a lower cover, a blocker and an upper cover. The body portion may have a height or a thickness. The height or thickness may be substantially low profile (e.g., 3 cm or less or 2 cm or less). The height or thickness may be sufficiently thin so that the printed circuit boards, upper cover, lower cover, primary controllers, secondary covers, blocker, or a combination thereof when connected to the body portion are coplanar with a top of the light emitting portion, have a recess to receive components so that the components are located within or below a plane of a top of the light emitting portion. The height may be about 1 mm or more, 2 mm or more, 3 mm or more, 4 mm or more, or about 5 mm or more. The height may be about 3 cm or less, about 2 cm or less, or about 1 cm or less. The height of the body portion may be less than a height of the light emitting portion. The height of the light emitting portion relative to the body portion may be about 1× or more, about 1.2× or more, about 1.5× or more, about 1.75× or more, about 2× or more, about 2.5× or more, or about 3× or more, The height of the light emitting portion relative to the body portion may be about 10× or less, about 8× or less, about 6× or less, or about 5× or less.

The light emitting portion functions to direct light outside of the light system. The light emitting portion may direct light to a predetermined location. The light emitting portion may diffuse light, direct light, magnify light, spread light, or a combination thereof. The light emitting portion act as a lens. The light emitting portion may have concave portions, convex portions, raised surfaces, recessed surfaces, geometric shapes formed on an outer surface, diamonds on outer surfaces, or a combination thereof. The light emitting portion may have a height that is about 3 mm or more, 5 mm or more, 7 mm or more, 1 cm or more, 2 cm or more, or 3 cm or more. The light emitting portion may have a height that is about 10 cm or less, 7 cm or less, 5 cm or less, or 4 cm or less. The light emitting portion may be an outer most portion of the light bar. The light emitting portion may act as a lens and may perform one or more of the functions or include one or more of the features set forth herein for the lenses. The light bar may be located behind a lens.

The one or more lenses function to direct the light from the reflectors to a location to be illuminated. The lenses may function to protect the light emitting portion. The lenses may bend light. The lenses may refract light. The lenses may diffuse the light, blend the light, spread the light, direct the light to a predetermined location, create one or more hot spots, or a combination thereof. The lens may be located in front of the light emitting portion. The lenses may cover all or a portion of the light system, the light source, light bars, or a combination thereof. Each light system may include a lens. The light system may include a single lens that covers each of the light bars that each provide or perform a different function. The lens may cover the light bar so that light, direct light, reflected light, or a combination thereof extends through the lens. The lens may be one or more lenses. The lens may be a plurality of lenses. The lens (e.g., primary lens or internal lens) may be a single lens. The one or more lenses may have a shape that directs light to a predetermined location. The one or more lenses may be flat, planar, bio-convex, plano-convex, positive meniscus, negative meniscus, plano-concave, bio-concave, double convex, converging, diverging, or a combination thereof. Each lens may be a single lens. Each lens may be a compound lens (e.g., there may be more than one lens). Each lens has a forward side and a rearward side.

The forward side, the rearward side, or both function to reflect the light, refract the light, spread the light, aim the light to a predetermined location, or a combination thereof. The forward side and the rearward side may be parallel to each other. The forward side and the rearward side may have an angle relative to one another. For example, a forward surface may be planar and the rearward surface may be curved or angled. Conversely, the rearward surface may be planar and the forward surface may be curved. The shape of the forward surface, the rearward surface, or both may have a shape. The shape of the forward surface, the rearward surface, or both may be selected to determine where light is directed. The forward surface, the rearward surface, of both may cause light to diverge, converge, spread, create a hot spot, blend the light, or a combination thereof. The forward side, the rearward side, or both may be concave, convex, spherical, or a combination thereof to produce a shape such as bioconcave, bioconvex, plano-concave, plano-convex, meniscus, or a combination thereof. The forward side may be located proximate to a lens (e.g., an outer lens) of the light system. The forward side of the lens may be the forward side of the light emitting portion and may be covered by an outer lens.

The outer lens or lens may function to protect the light system, house all of the internal components, or both. The lens (e.g., outer lens) may be an outer most part of a light system. The lens may receive all of the light from the lens to be directed outward from the vehicle, in a direction of movement of a vehicle or, both. The lens may be sufficiently strong to protect the light system from rocks and debris as the vehicle moves. The lens may cover all of the light sources, all of the light bars, all of the light sources, or a combination thereof of the light system (e.g., a first light bar, a second light bar, or a third light bar). The lens may be transparent so that light may extend through the outer lens. The lens may cover the light bars and the blockers.

The one or more blockers function to prevent light from passing between light bars. The one or more blockers may direct light in a predetermined direction. The one or more blockers may prevent light from exiting the light bars. The one or more blockers may direct light back into the light bars. The one or more blockers may be locked above, below, on a first side, on a second side, on a major surface (e.g., surface with the highest surface area), on a minor surface (e.g., edge), or any location therebetween. The one or more blockers may extend over the body portion. The one or more blockers may extend along a first side (e.g., top), a second side (e.g., bottom), or both. The one or more blockers may be opaque, reflective, or both. The one or more blockers may include a recess that receives all or a portion of the body portion, the light emitting portion, or both. The recess may be sufficiently deep to block a portion or a vertical component of a light bar in addition to the horizontal component of a light bar. The light blocker may mirror a shape of the light bars. The light blocker may have an upper surface that receives a first light bar, a lower surface that receives a second light bar, or both. The light blocker may align one light bar to a second light bar. The light blocker may align one or more light bars within an upper cover, a lower cover, or both. The light blocker may align one or more printed circuit board to one of the plurality of light bars.

The two or more (or plurality of) printed circuit board functions to control the sets of light sources, power the sets of light sources, carry the sets of light sources, or a combination thereof. The printed circuit boards may each carry two or more sets of light sources. The printed circuit boards may have a plurality of sets of light sources. Each of the sets of light sources may include a plurality of light sources (e.g., a first set of lights includes 4 light sources and a second set of lights includes 4 different light sources). The printed circuit boards may have sets of light sources located in rows, staggered, randomly places, placed in patters, or a combination thereof. The printed circuit boards may carry two or more sets of light sources and each of the two or more sets of light sources may produce a different lighting function. The printed circuit boards may simultaneously control two or more sets of light sources that operate at a same time. The printed circuit boards may control the two or more sets of light sources so that two different lighting functions are produced at a same time and two different lighting functions are produced. The printed circuit boards may substantially extend a length of the light system, the light bars, or both. The printed circuit boards may follow a shape of the light bars. The printed circuit boards be located in a single plane. The printed circuit boards may all be coplanar. Substantially all of each of the printed circuit boards may be coplanar or located within a single plane (e.g., 75 percent or more, 80 percent or more, or 90 percent or more). The printed circuit boards may be located end to end. For example, a second end of a first printed circuit board may be located adjacent or juxtaposed next to a first end of a second printed circuit board. The two or more printed circuit boards may be two circuit boards, three circuit boards, four circuit board, or even five circuit boards. The circuit boards may be located in a straight line, a pattern, an arcuate shape, a curve, so that a central region of all of the circuit boards forms an apex, or a combination thereof. A gap may be located between each of the printed circuit boards. The gap may be sufficiently large so that the printed circuit boards may follow a curvature of the light bars. The gap may have a uniform width. The width of the gap may vary. The width may be about 1 mm or more, 2 mm or more, or 3 mm or more. The gap may be 5 cm or less, 4 cm or less, 3 cm or less, 2 cm or less, or 1 cm or less. The Each of the circuit boards controls two or more sets of light sources that provide light at a same time, intermittently, in series, in parallel, or a combination thereof. The printed circuit board may be a through hole circuit board. The printed circuit board may have surface mounted circuitry. The printed circuit boards may be solid board. The printed circuit board may be flexible, an ISM style, single sided, double sided, multi layered, rigid, flex, rigid-flex, or a combination thereof printed circuit board. Each of the printed circuit boards may have one or more controllers (e.g., secondary controller).

The one or more secondary controllers may function to control light sources on one of the printed circuit boards. The one or more secondary controllers function to control all of the two or more sets of light sources. The one or more secondary controllers may control a first set of light sources and a second set of light sources at a same time. The one or more secondary controllers may control a plurality of light sources within a set of light sources. For example, the secondary controller may fire the light sources in sequence to form a pattern such as when a turn signal is activated to illuminate in a direction of signaling. The secondary controllers may create animation for the lights. The secondary controllers may communicate with a primary controller. The secondary controller may execute commands from a primary controller. The secondary controller may communicate commands from the primary controller to one of the two or more sets of light sources.

The primary controller functions to control the entire light system. The primary controller functions to provide commands to one or more secondary controllers. The primary controller functions to communicate with a main controller of a vehicle. The primary controller may receive signals from a user and relay those signals to the respective secondary controllers. The primary controller may be located outside of the light system. The primary controller may be located inside of the light system, on a printed circuit board, or both. The primary controller, secondary controller, or both may be located adjacent to or proximate to one or more locators.

The locators may function to align a light aiming device relative to another light aiming device a blocker, a printed circuit board, a light source, an upper cover, a lower cover, or a combination thereof. The locators may extend from the lower cover, the upper cover, a primary light aiming device, a secondary light aiming device, a blocker, or a combination thereof. Preferably, the locators are located on an extend from a component located directly above the lower cover. The component may be in direct contact with and located above the lower cover with the locator extending away from the lower cover. The locator may extend from a secondary light aiming device or a primary light aiming device and then align all of the components located thereabove (e.g., if the secondary light aiming device is a bottom most component above a lower cover then the locator may extend from the secondary light aiming device through a blocker, a primary light aiming device, into a printed circuit board, and optionally into contact with an upper cover). The locators may extend orthogonally relative to a light aiming device. The locators may be a primary locator, a secondary locator, a tertiary locator, and so on depending upon how many locators are present within a light system. Each light aiming device may include one or more locators and preferably a plurality of locators. Each light aiming device may include a plurality of locators in communication with each of the printed circuit boards. The locators may align each of a component the locator extends through or a is located above a component the locator is connected. A primary locator may locate at least a primary light aiming device and a secondary light aiming device to a printed circuit board. A secondary locator may only locate a primary light aiming device or a secondary light aiming device to a printed circuit board. Each locator may locate in one direction. For example, a primary locator may locate in a first direction and a secondary locator may locate in a second direction which extends in a different direction relative to the first direction. The primary direction may be lengthwise and the secondary direction may be widthwise. The locators may extend through a locator receiver.

The locator receivers function to receive a locator and restrict movement of the locator and connected components in one or more directions. The locator receivers may permit movement of a locator in one direction and restrict movement of the locator in any other direction. The locator receivers may be a through hole or recess within a printed circuit board, the light aiming devices, blocker, or a combination thereof. The locator receivers may locate a printed circuit board relative to a locator, a primary light aiming device, a secondary light aiming device, a blocker, a light source, a light guide, a cover, or a combination thereof. The locator receivers may allow for some tolerances in a direction (e.g., some movement due to inconsistency in manufacturing tolerances). The locator receivers may have a shape this circular, oval, square, triangular, geometric, non-geometric, slotted, an "X", or a combination thereof. The locator receivers my have a size in a first direction that is equal to a size of a locator in the first direction and a size in a second direction that larger than a size of the locator such that the locator may move in the second direction but be restricted in the second direction. The locator receivers may extend in first direction (e.g., permit movement in the first direction). The locator receivers may extend in a second direction (e.g., permit movement in the second direction). Primary locator receivers may extend in a primary direction (e.g., a longitudinal direction). The secondary locator receivers may extend in a secondary direction (e.g., a lateral direction). The primary direction may be length of a printed circuit board and the secondary direction may be a width of the printed circuit board. The primary direction and the secondary direction may be perpendicular to one another. The upper cover functions to extend over a top light bar, act as a blocker, connect the light system within a vehicle, connect a lens, or a combination thereof. The upper cover prevent fluid from extending into the light system. The upper cover may extend over an entire upper surface of the light bars, the printed circuit boards, or boy. The upper cover may connect to a lower cover.

The lower cover functions to extend under a bottom light bar, act as a blocker, connect the light system within a vehicle, connect a lens, or a combination thereof. The lower cover may prevent fluid from entering the light system. The lower cover may extend under an entire lower surface of the light bars. The lower cover and upper cover may sandwich the light bars, printed circuit boards, blockers, or a combination thereof therebetween. The lower cover may include one or more carrier brackets.

The carrier brackets function to connect the light system within a vehicle, another light system, or both. The carrier bracket may form an "L" shape with the lower cover. The carrier bracket may include one or more through holes. The carrier bracket may extend perpendicular to the light guides, a portion of the lower cover, or both. The carrier bracket may extend from an end of the lower cover opposite the lens. The carrier bracket may form part of a total height of the light system. Preferably, the carrier bracket is not part of a height of the light system. A total height of the light system may be a total height of the stack up between the upper cover and the lower cover including the upper cover and lower cover.

The total stack up of the light system may have a lower profile. The low profile may be about 1 cm or more, about 2 cm or more, about 3 cm or more, 4 cm or more, 5 cm or more, 7 cm or more. The low profile may be about 30 cm or less, about 25 cm or less, about 20 cm or less, about 15 cm or less, or about 10 cm or less. The total stack up may extend from an internal location of a vehicle to an external location of a vehicle. The total stack up (e.g., low profile) may be between about 1 mm and 10 mm, 2 mm and 5 mm, or 2.5 mm and 4 mm.

Figure 1:
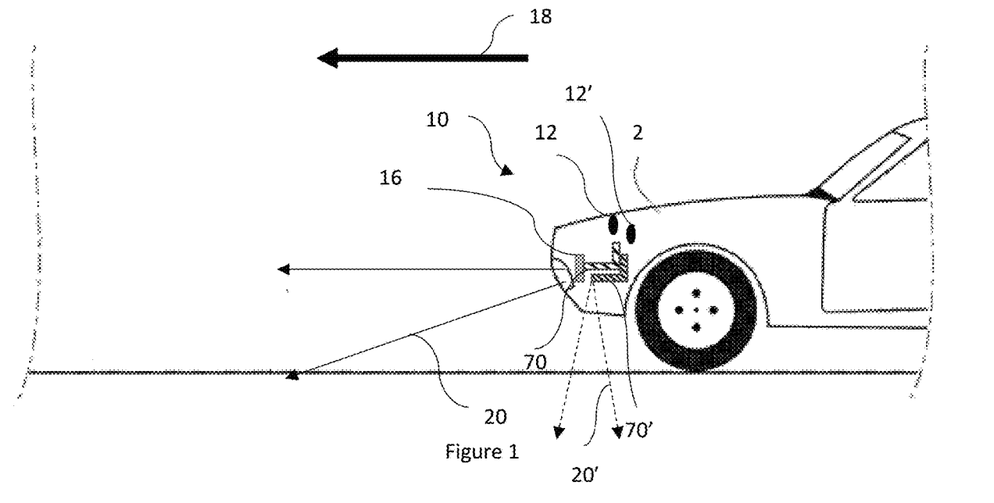
FIG. 1 is a side view of a vehicle including the light system.

FIG. 1 illustrates a side view of a vehicle 2 including a light system 10. The light system 10 includes light sources 12, 12'; light aiming devices 70, 70'; and a lens 16. The vehicle 2 and some of the light 20 are projected in the direction 18 in front of the vehicle 2. Some of the light 20' projects both in the direction 18 and in a side direction relative to the vehicle 2.

Figure 2:
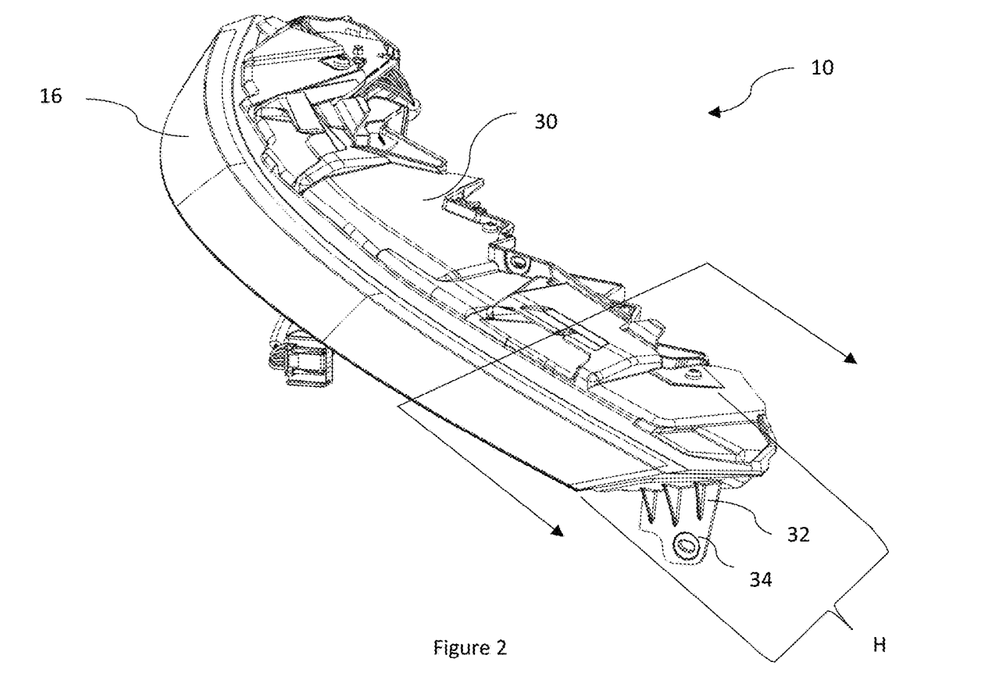
FIG. 2 is a top perspective view of a light system.

FIG. 2 illustrates a top perspective view of the light system 10. The light system includes an upper cover 30 and a lower cover 32 that make up a total stack-up height (H) of the entire light system 10 with all of the internal components (not shown) located there between. The upper cover 30 and the lower cover 32 are connected to a lens 16 that creates an outer surface where light is projected through. The lower cover 32 includes a carrier bracket 34 to connect the light system 10 within a vehicle (not shown) or another light assembly (not shown).

Figure 3:
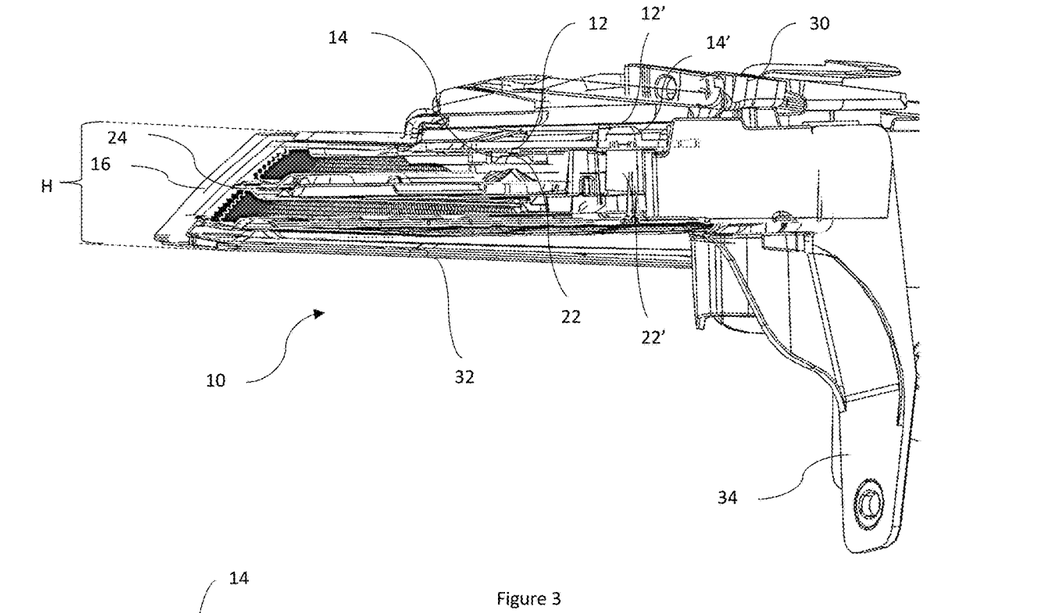
FIG. 3 is a cross-sectional view of the light system of FIG. 2.

FIG. 3 is a cross-sectional view of the light system 10 of FIG. 2. The light system 10 includes an upper cover 30 spaced apart from a lower cover 32 by a light bar 14, a blocker 24, and a light bar 14'. A lens 16 extends between the upper cover 30 and the lower cover 32 and extends in front of the light bar 14 and light bar 14'. The light system has a height (H) from a top of the upper cover 30 to a bottom of lower cover 32. The light bar 14 includes a light guide 22 that is aligned with and receives light from the light source 12 so that the light is projected in a predetermined direction by the light bar 14. The light bar 14' includes a light guide 22' that is aligned with and receives light from the light source 12' so that the light is projected in a predetermined direction by the light bar 14'. The blocker 24 prevents light in the light bar 14 from extending into the light bar 14' and vice versa. A carrier bracket 34 extends downward from the light system 10 to connect the light system 10 within a vehicle or another light system (not shown).

Figure 4:
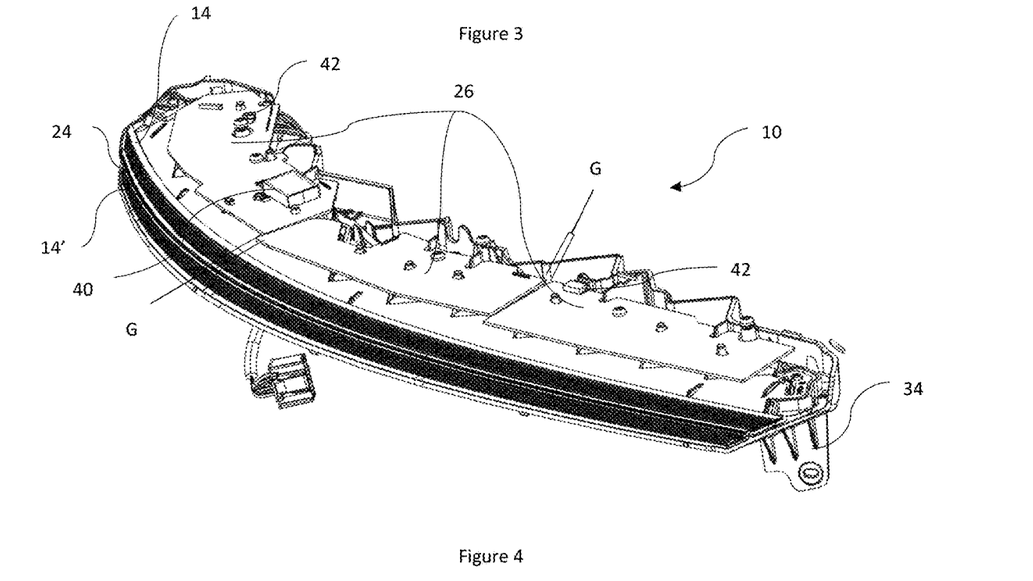
FIG. 4 is a top perspective view of a light system with a cover removed.

FIG. 4 is a top perspective view of the light system 10 with the upper cover removed and a carrier bracket 34 extending downwards. With the upper cover removed the plurality of printed circuit boards 26 are visible above a portion of the light bar 14 and light bar 14'. The light bar 14 and the light bar 14' are spaced apart by a blocker 24. A gap (G) is located between each of the printed circuit board 26 along a length of the light system 10. The printed circuit boards 26 are located substantially end to end and extend substantially in a same plane. The printed circuit boards 26 include secondary controllers 42 that are in communication with a primary controller 40.

Figure 5:
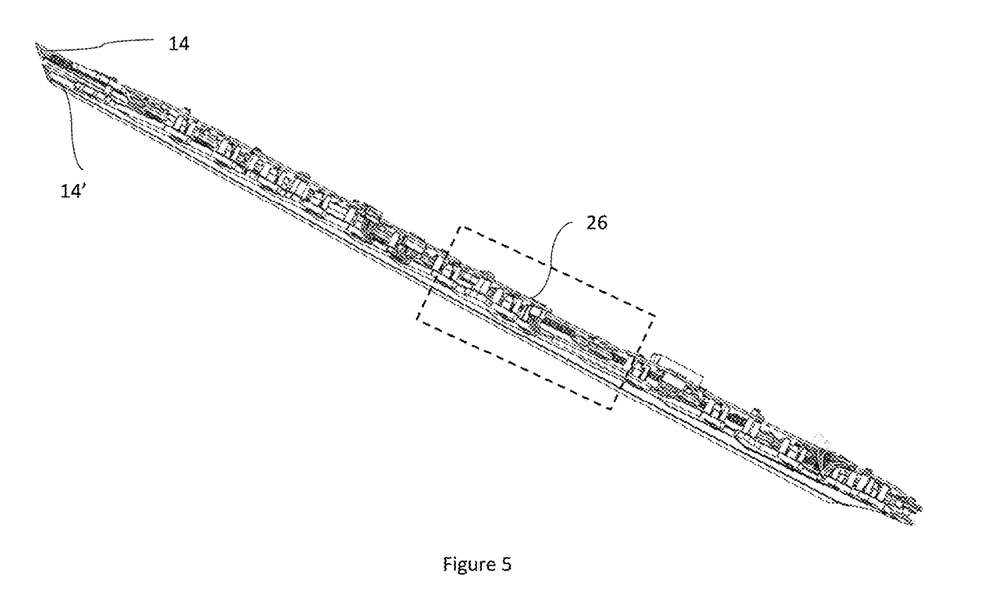
FIG. 5 is a rear view of the light system of FIG. 5.

FIG. 5 illustrates a rear view of the light system with printed circuit boards 26 extending above the light bar 14 and light bar 14'. The blocker has been removed from a location between the light bar 14 and light bar 14'.

Figure 6:
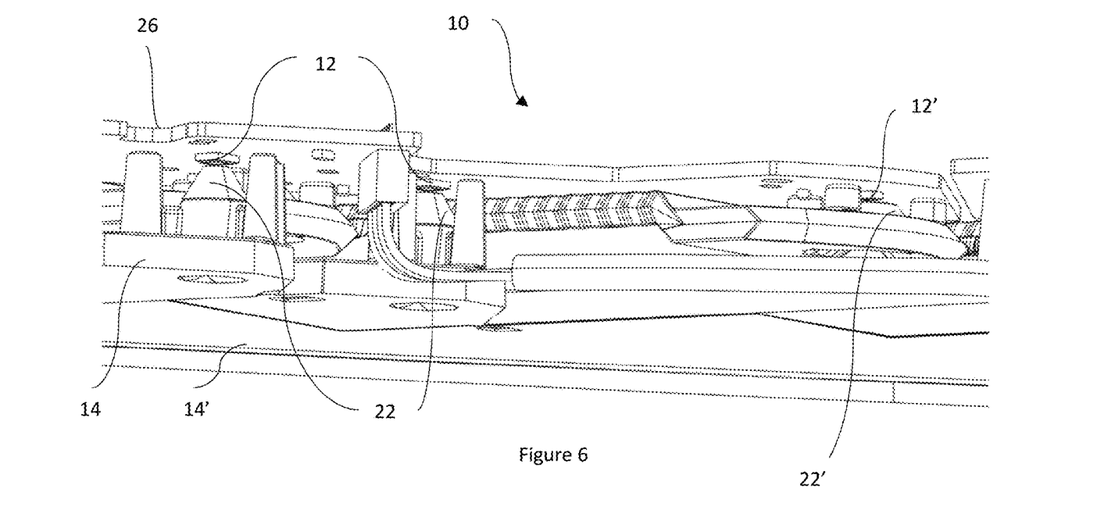
FIG. 6 is a close-up view of the light system of FIG. 6.

FIG. 6 is a close-up view of a rear surface of the light system 10. The printed circuit board 26 including light sources 12 and light sources 12' extends above light guides 22 and light guides 22' respectively. The light sources 12 are aligned with light guides 22, which extend upward from the light bars 14 and the light guides 22 receive light from the light sources 12 to transport light into the light bars 14. The light sources 12' are aligned with light guides 22', which extend upward from the light bars 14' and the light guides 22' receive light from the light sources 12' to transport light into the light bars 14'. The light sources 12 and light sources 12' are offset relative to each other so that the light guide 22 is extendable from the light bar 14 around the light bar 14' into a proximate relationship with the light source 12.

Figure 7:
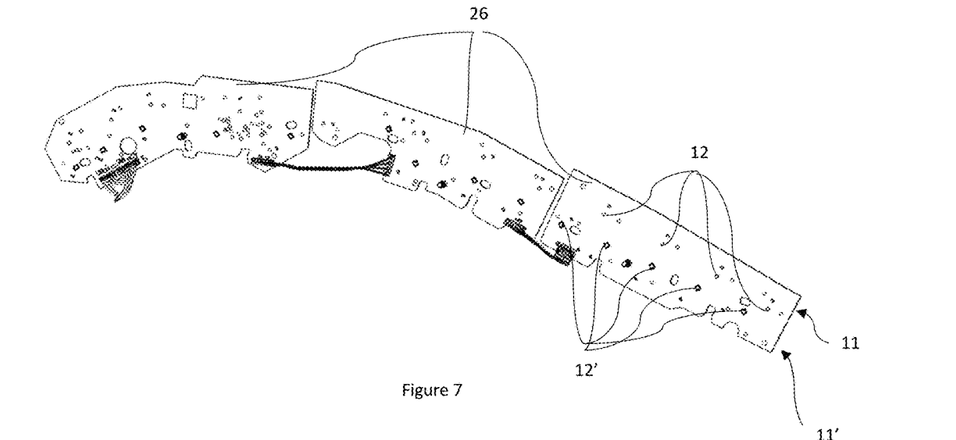
FIG. 7 is a bottom view of printed circuit boards.

FIG. 7 is a bottom view of a plurality of printed circuit boards 26. The printed circuit boards 26 are electrically connected and located end to end relative to one another. Each printed circuit board 26 includes a first set of light sources 11 and a second set of light sources 11' that are spaced apart to provide different lighting functions. The first set of light sources 11 includes a plurality of lights 12 and a second set of light sources 11' includes a plurality of lights 12'. The lights 12 are located in a first row and the lights 12' are located in a second row spaced apart from the first row.

Figure 8:
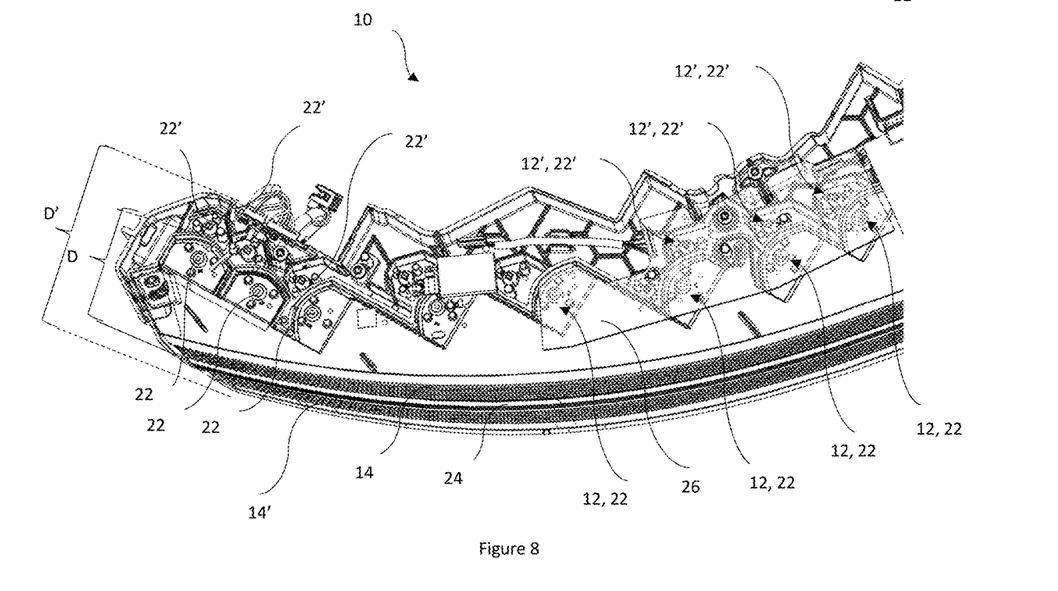
FIG. 8 is a top view of a partial light system with one printed circuit board removed and a second printed circuit board shown as transparent.

FIG. 8 illustrates the light system 10 with one printed circuit board being removed and one printed circuit board 26 being shown in transparent. The light system 10 includes a light bar 14 and a light bar 14' spaced apart by a blocker 24. The light bar 14 extends inwards (e.g., in a widthwise direction) a first distance (D) and has a plurality of light guides 22 that extend upwards (as shown in the fully exposed region). The plurality of light guides 22 are aligned with a respective light source 12 (as shown through the transparent printed circuit board 26) so that light extends from the light source 12 into the light guide 22 and into the light bar 14. The light bar 14' extends inwards a second distance (D') and has a plurality of light guides 22' that extend upwards (as shown in the fully exposed region) and has a plurality of light guides 22' aligned with a respective light source 12' (as shown through the transparent printed circuit board 26'). The second distance (D') is shown as being wider than and extending beyond the first distance (D) so that light bar 14' extends beyond the light bar 14 on a first side and a second side and receives light from the light sources 12' on the second side without interference.

Figure 9:
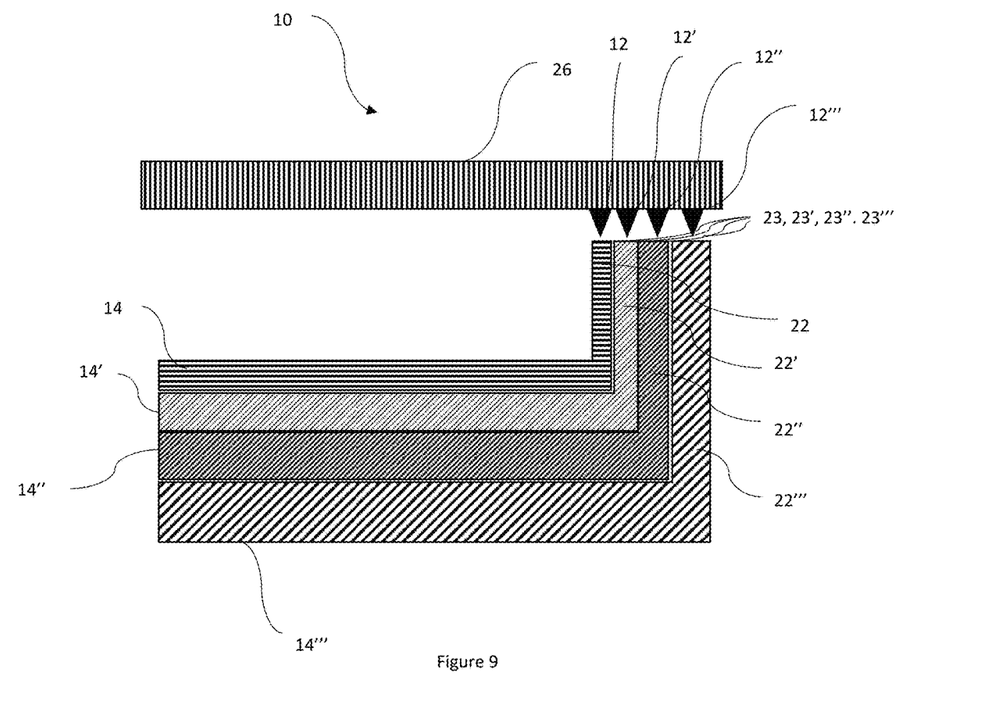
FIG. 9 is plan side view of a light system.

FIG. 9 illustrates a light system 10 including a plurality of light sources (12, 12', 12", 12''') and light bars (14, 14', 14", 14'''). A printed circuit board 26 includes a plurality of light sources (12, 12', 12", 12''') that are each aligned a light guide (22, 22', 22", 22''') of a light bar (14, 14', 14", 14'''). Light from a first light source 12 extends into a first light guide 22 and then out of the light bar 14 so that the light is visible. Light from a second light source 12' extends into a second light guide 22' and then out of the light bar 14' so that the light is visible and similarly a third light source 12" and fourth light source 12''' function in a same fashion. Each of the light guides (22, 22', 22", 22''') include a light receiving portion (23, 23', 23", 23''') that are substantially coplanar.

Figure 10:
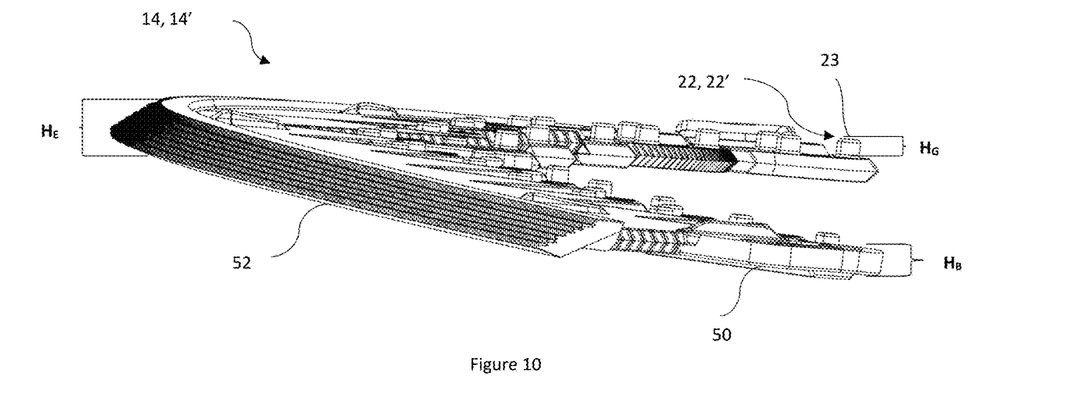
FIG. 10 is a perspective side view of a light bar.

FIG. 10 is a perspective side view of a light bar 14, 14' having a body portion 50 and a light emitting portion 52. The body portion 50 has a height ($H_B$) and the light emitting portion 52 has a height ($H_E$). The light guides 22, 22' extend from the body portion 50 a height ($H_G$) that extends from a top of the body portion 50 to a top portion 23 of the light guides 22, 22'.

Figure 11:
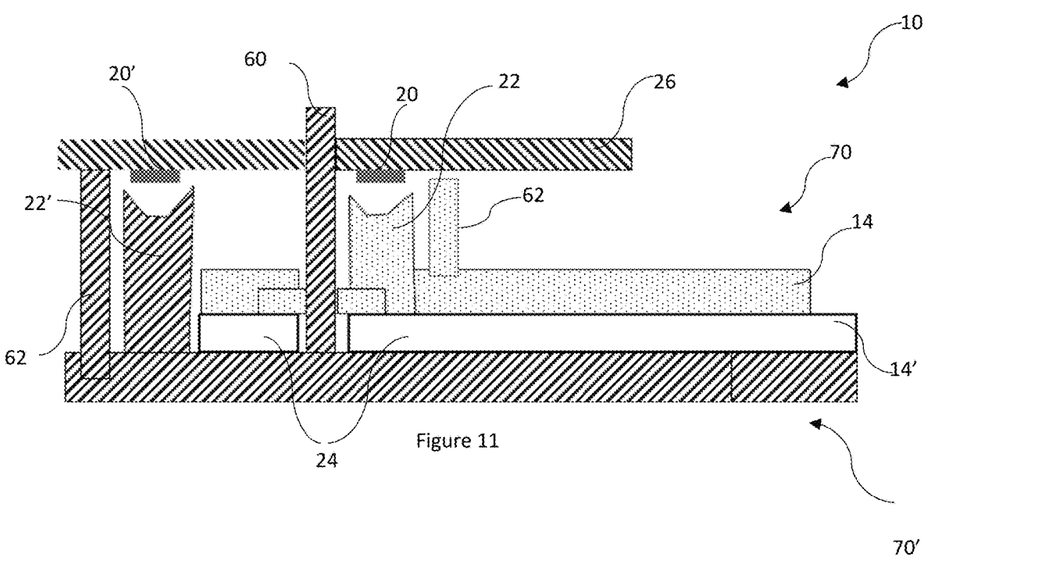
FIG. 11 is a cross-sectional view of a light system including two light aiming devices.

FIG. 11 is a cross-sectional view of a light system 10. The light system 10 includes a printed circuit board 26, a primary light aiming device 70, a blocker 24, and a secondary light aiming device 70'. A primary locator 60 extends from the secondary light aiming device 70' through the blocker 24, the primary light aiming device 70 and through the printed circuit board 26 to align all of the components relative to one another. Secondary locators 62 extend from the primary light aiming device 70 and the secondary light aiming device 70'. The secondary locators 62 provide a second point of contact to align the printed circuit board 26 and the primary light aiming device 70 and the secondary light aiming device 70'. The light aiming devices 70, 70' include a light guide 22, 22' and light bars 14, 14'. Once aligned, light from the lights 20, 20' extend from the printed circuit board 26 into light guides 22, 22' respectively of the light aiming devices 70, 70'. The light travels through the light guides 22, 22' into a light bar 14, 14' and is directed in a predetermined direction. The blocker 24 prevents light within the light bar 14 extending into the light bar 14' and vice versa.

Figure 12:
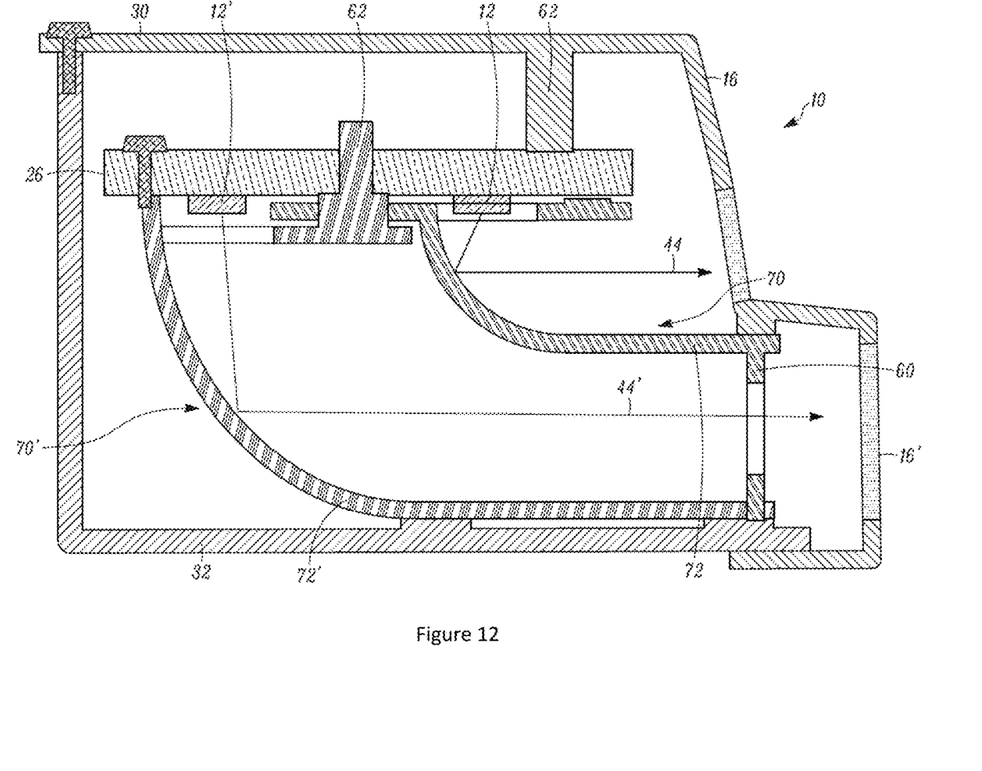
FIG. 12 is a cross-sectional view of a light system including two light aiming devices.

FIG. 12 is a cross-sectional view of a light system 10. The light system includes a printed circuit board 26, a primary light aiming device 70, and a secondary light aiming device 70'. A primary locator 60 extends through and aligns the primary light aiming device 70 and secondary light aiming device 70' with the upper cover 30 and the lower cover 32. With the primary light aiming device 70 and secondary light aiming device 70' being located relative to one another by the primary locator 30, the printed circuit board 26 is aligned via secondary locators 62. The secondary locators 62 extend between the primary light aiming device 70 and the printed circuit board 26, and between the printed circuit board 26 and the upper cover 30. The printed circuit board 26 being aligned, aligns the light sources 12, 12' with the light aiming devices 70, 70', which as shown are reflectors 72, 72'. The reflectors 72, 72' receive light from the light sources 12, 12' and direct the light in the direction 44, 44' through the lenses 16, 16' as shown.

Figure 13:
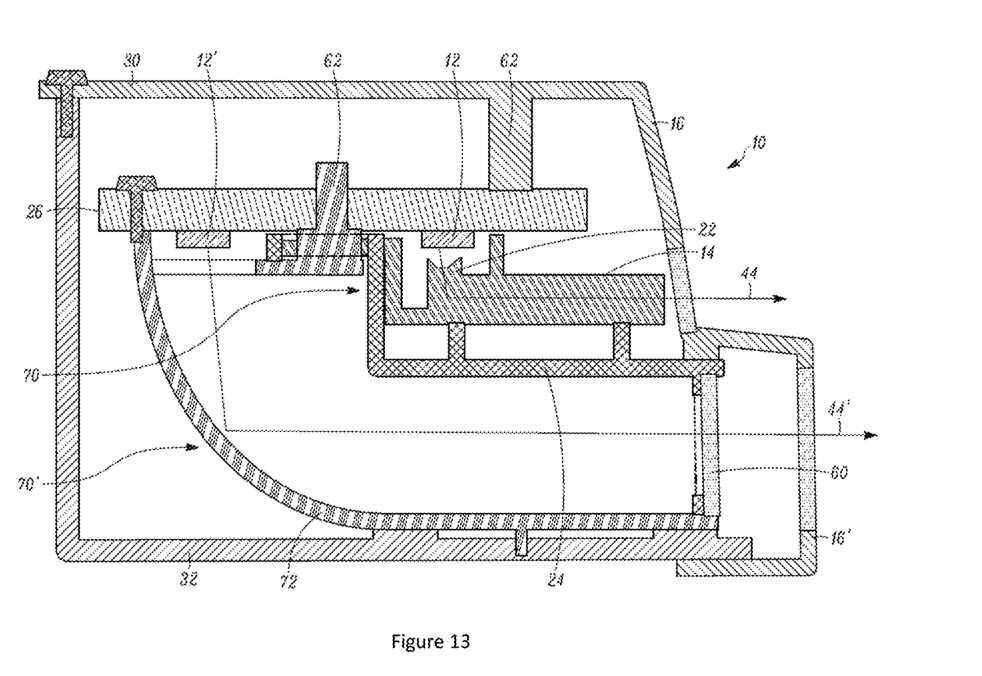
FIG. 13 is a cross-sectional view of a light system including two light aiming devices wherein one is a light guide and one is a reflector.

FIG. 13 is a cross-sectional view of a light system 10. The light system includes a printed circuit board 26, a primary light aiming device 70, and a secondary light aiming device 70'. A primary locator 60 extends through and aligns the primary light aiming device 70 and secondary light aiming device 70' with the upper cover 30 and the lower cover 32. With the primary light aiming device 70 and secondary light aiming device 70' being located relative to one another by the primary locator 30, the printed circuit board 26 is aligned via secondary locators 62. The secondary locators 62 extend between the primary light aiming device 70 and the printed circuit board 26, and between the printed circuit board 26 and the upper cover 30. The printed circuit board 26 being aligned, aligns the light sources 12, 12' with the light aiming devices 70, 70', which as shown are a reflector 72 and a light bar 14 with a light guide 22. The reflector 72 and light bar 14 receive light from the light sources 12, 12' respectively and direct the light in the direction 44, 44' through the lenses 16, 16' as shown. The light guide 22 of the light bar 14 is aligned with the light source 12. The light guide 14 and the reflector 72 are separated by a blocker 24 that prevents light from extending therebetween.

Figure 14:
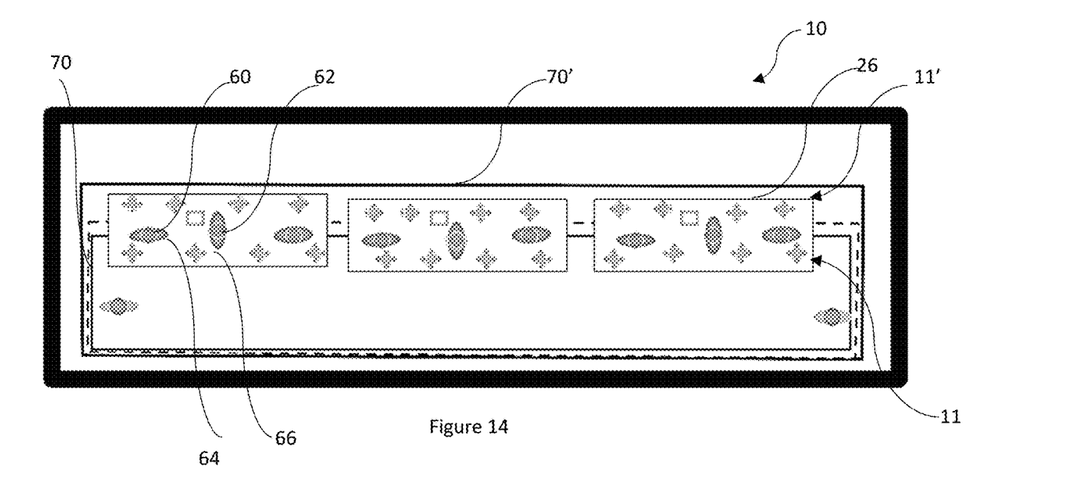
FIG. 14 is top view of a light system and alignment features of the light system.

FIG. 14 is a top view of a light system 10 illustrating alignment of all of the features relative to one another. A printed circuit board 26 is located above a primary light aiming device 70 and a secondary light aiming device 70'. The printed circuit board 26 includes a primary set of light sources 11 and a secondary set of lights 11' with primary locator receivers 64 and secondary locator receivers 66 extending through the printed circuit board 26. The primary locator receivers 64 accept primary locators 60 that locate the printed circuit board 26, the primary light aiming device 70 and secondary light aiming device 70' in a first direction and the secondary locator receivers 66 receive secondary locaters 62 that locate the printed circuit board 26, the primary light aiming device 70 and secondary light aiming device 70' in a second direction.

Variation 1 comprises: a light system comprising: (a) a plurality of printed circuit boards; (b) a plurality of sets of light sources on each of the plurality of printed circuit boards that are configured to provide a different lighting function, wherein each of the plurality of sets of light sources include one or more light source that generates light; (c) a plurality of light bars that distribute the light from each of the plurality of sets of light sources; and (d) one or more light guides on each of the plurality of light bars, wherein each of the one or more light guides is aligned with one or more of the one or more light sources so that the light passes from the one or more light sources into one of the one or more light guides and into one of the plurality of light bars to provide one of the different lighting functions.

Variation 2 may comprise the light system of variation 1, wherein the plurality of light bars are spaced apart by a blocker that prevents light from one of the plurality light bars from extending into a second of the plurality of light bars.

Variation 3 may comprise the light system of any of variations 1-2, wherein plurality of sets of light sources each generate the light in a different color or different wavelength.

Variation 4 may comprise the light system of any of variations 1-3, wherein the plurality of light bars comprises a first light bar and a second light bar.

Variation 5 may comprise the light system of any of variations 1-4, wherein the first light bar is located above and extends substantially parallel to the second light bar.

Variation 6 may comprise the light system of any of variations 1-5, wherein first light bar and the second light bar have different widths so that the second light bar extends beyond the first light bar so that light from a second set of light sources of the plurality of light sources extends into the second light bar at a location beyond the first light bar so that the first light bar is free of blocking the light from the second set of light sources.

Variation 7 may comprise the light system of any of variations 1-6, wherein the first light bar extends beyond the second light bar on a first side and a second side in a width direction.

Variation 8 may comprise the light system of any of variations 1-7, wherein the first light bar and the second light bar are substantially identical in length.

Variation 9 may comprise the light system of any of variations 1-8, wherein the plurality of printed circuit boards are located end to end.

Variation 10 may comprise the light system of any of variations 1-9, wherein a gap is located between each of the plurality of printed circuit boards.

Variation 11 may comprise the light system of any of variations 1-10, wherein the plurality of printed circuit boards are substantially co-planar.

Variation 12 may comprise the light system of any of variations 1-11, wherein the one or more light guides extend from the plurality of light guides towards one of the light sources of the plurality of light sources.

Variation 13 may comprise the light system of any of variations 1-12, wherein the one or more light guides have a cross-sectional area and one of the one or more light sources is located within the cross-sectional area so that the light emitted from the one of the one or more light sources is directed into the one or more light guides.

Variation 14 may comprise the light system of any of variations 1-13, wherein the plurality of circuit boards have an arcuate shape when located adjacent to one another.

Variation 15 may comprise the light system of any of variations 1-14, wherein each of the plurality of printed circuit boards include a secondary controller.

Variation 16 may comprise the light system of any of variations 1-15, wherein a primary controller is in communication with each of the secondary controllers.

Variation 17 may comprise the light system of any of variations 1-16, wherein the one or more light guides on the first light bar have a light receiving portion that is substantially coplanar with the one or more light guides on the second light bar.

Variation 18 may comprise the light system of any of variations 1-17, wherein the one or more light guides on the first light bar have a height that is less than a height of the one or more light guides on the second light bar.

Variation 19 may comprise the light system of any of variations 1-18, wherein each of the plurality of light guides have a body portion with a height and a light emitting portion with a height that is greater than the height of the body portion.

Variation 20 may comprise: a light system comprising: (a) two or more printed circuit boards that are located within the light system substantially end to end with one another; (b) two or more of sets of light sources on each of the two or more printed circuit boards that are configured to provide a light that is a different color light or a different wavelength of light, each of the two or more sets of light sources includes: (i) one or more light source that generate the light; (c) two or more light bars that distribute the light, wherein the two or more light bars are located within substantially parallel planes; (d) one or more light guides extending from each of the two or more light bars to receive light from one of the one or more light sources; (e) a blocker located between the two or more light bars that prevents light from the two or more light bars from extending therebetween; and (f) one or more controllers that control the two or more sets of light sources.

Variation 21 may comprise: a light system comprising: (a) two or more printed circuit boards that are located within the light system substantially end to end with one another; (b) two or more of sets of light sources on each of the two or more printed circuit boards that are configured to provide a light that is a different color light or a different wavelength of light, each of the two or more sets of light sources includes: (i) one or more light source that generate the light; (c) two or more light aiming devices that distribute the light, wherein the two or more light aiming devices have a substantially similar shape; (d) one or more locators that align each of the two or more printed circuit boards relative to one or both of the two or more light aiming devices; and (d) one or more locator recesses that receive one of the one or more locators and align one of the one or more printed circuit boards to one or more of the two or more light aiming devices.

Variation 22 may comprise the light system of variation 16 or any of the preceding variations, wherein the two or more light aiming devices are a reflector, a light bar, or both.

Variation 23 may comprise the light system of variation 16 or any of the preceding variations, further comprising a blocker located between the two or more light aiming devices.

Variation 24 may comprise the light system of variation 16 or any of the preceding variations, further comprising one or more controllers that control the two or more sets of light sources.

Variation 25 may comprise the light system of variation 16 or any of the preceding variations, wherein some the one or more locator recesses are primary locator recesses extend in a first direction and some of the one or more locator recesses are secondary locator recesses that extend in a second direction that is different from the first direction and the primary locator recesses receive primary locators and the secondary recesses locate secondary locators that align the light aiming devices, the printed circuit board, or a combination thereof relative to each other.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
10 Light System
11 Set of light sources
11' Set of light sources
12 Light Source
12' Light Source
14 Light Bar
14' Light Bar
16 Lens
18 Direction of Movement
20 Light
20' Light
22 Light Guide
22' Light Guide
23 Light receiving Portion
24 Blocker
26 Printed Circuit board
30 Upper Cover
32 Lower Cover
34 Carrier Bracket
40 Primary Controller
42 Secondary Controller 44 Directed Light
50 Body Portion
52 Light Emitting Portion
60 Primary Locator
62 Secondary Locator
64 Primary Locator Receiver
66 Secondary Locator Receiver
70 Light Aiming Device
72 Reflector
H Total stack Up Height

We claim:

1. A light system of a vehicle comprising:
a. a plurality of printed circuit boards located within a board plane;
b. a plurality of sets of light sources on each of the plurality of printed circuit boards that are configured to provide a different lighting function, wherein each of the plurality of sets of light sources include one or more light source that generates light;
c. a plurality of light bars that distribute the light from each of the plurality of sets of light sources, wherein the plurality of the light bars comprise:
  i. a body portion and
  ii. a light emitting portion, wherein the body portion forms a plane and the light emitting portion is an edge of the plane; and
d. one or more light guides on each of the plurality of light bars, wherein each of the one or more light guides is aligned with one or more of the one or more light sources so that the light passes from the one or more light sources into one of the one or more light guides and into one of the plurality of light bars to provide one of the different lighting functions; and
wherein a first of the plurality of light bars extends within a first plane and a second of the plurality of light bars extends within a second plane;
wherein the first plane, the second plane, and the board plane are all parallel and overlapping so that the light emitting portions form a forward end of the first plane and a forward end the second plane respectively to emit the light outward from the light system of the vehicle.

2. The light system of claim 1, wherein the plurality of light bars are spaced apart by a blocker that prevents light from one of the plurality light bars from extending into a second of the plurality of light bars.

3. The light system of claim 1, wherein plurality of sets of light sources each generate the light in a different color or different wavelength.

4. The light system of claim 1, wherein the plurality of light bars comprises a first light bar and a second light bar.

5. The light system of claim 4, wherein the first light bar is located above and extends substantially parallel to the second light bar.

6. The light system of claim 4, wherein the first light bar and the second light bar have different widths so that the second light bar extends beyond the first light bar in a forward direction, a rearward direction, or both so that light from a second set of light sources of the plurality of light sources extends into the second light bar at a location beyond the first light bar in the forward direction, the rearward direction, or both.

7. The light system of claim 6, wherein the first light bar extends beyond the second light bar on a first side and a second side in a width direction; the first light bar and second light bar are substantially identical in length, wherein the length is substantially perpendicular to the width; or both.

8. The light system of claim 1, wherein each of the plurality of printed circuit boards comprise:
a forward end,
a rearward end,
a first side end extending between and connecting the forward end and the rearward end, and
a second side end opposite from the first side end and extending between and connecting the forward end and the rearward end, and
wherein the first end of a first of the plurality of printed circuit boards is located adjacent to the second end of a second of the plurality of printed circuit boards.

9. The light system of claim 8, wherein a gap is located between each of the plurality of printed circuit boards; the plurality of printed circuit boards are substantially co-planar; or both.

10. The light system of claim 1, wherein the one or more light guides extend from the plurality of light bars towards one of the light sources of the plurality of light sources.

11. The light system of claim 1, wherein the one or more light guides have a cross-sectional area and one of the one or more light sources is located within the cross-sectional area so that the light emitted from the one of the one or more light sources is directed into the one or more light guides.

12. The light system of claim 1, wherein the plurality of circuit boards have a front edge with an arcuate shape when located adjacent to one another.

13. The light system of claim 1, wherein a primary controller is in communication with a plurality of secondary controllers, wherein the primary controller provides commands to the plurality of secondary controllers and the secondary controllers each control one of the plurality of sets of light sources.

14. The light system of claim 4, wherein the one or more light guides on the first light bar have a light receiving portion that is substantially coplanar with a light receiving portion of the one or more light guides on the second light bar.

15. The light system of claim 4, wherein the one or more light guides on the first light bar have a height that is less than a height of the one or more light guides on the second light bar.

16. A light system of a vehicle comprising:
a. two or more printed circuit boards, extending along a board plane, and located within the light system substantially end to end with one another so that a first end of a first of the two or more printed circuit boards is located adjacent to a second end of a second of the two or more printed circuit boards;
b. two or more sets of light sources on each of the two or more printed circuit boards that are configured to provide a light that is a different color light or a different wavelength of light, each of the two or more sets of light sources includes:
  i. one or more light source that generate the light;
c. two or more light aiming devices that distribute the light, wherein the two or more light aiming devices have a substantially similar shape, and the two or more light aiming devices comprise:
  a first light bar and a second light bar, wherein the first light bar and the second light bar each comprise:
    a body portion and
    a light emitting portion, wherein the body portion forms a plane and the light emitting portion is an edge of the plane;
d. one or more locators extending from one or all of the two or more light aiming devices; and e. one or more locator recesses within each of the two or more printed circuit boards that receive one of the one or more locators so that the one or more locators when seated in the one or more locator recesses align one of the one or more printed circuit boards to one or more of the two or more light aiming devices;

wherein each of the two or more light aiming devices extend within a plane and have a light emitting portion where the light extends away from the light system of the vehicle; and wherein the first light bar extends within a first plane and the second light bar extends within a second plane with the first plane, the second plane, and the board plane all being parallel and overlapping so that the light emitting portions form a forward end of the first plane and a forward end the second plane respectively to emit the light outward from the light system of the vehicle.

17. The light system of claim 16, further comprising a blocker located between the two or more light aiming devices.

18. The light system of claim 16, further comprising one or more controllers that control the two or more sets of light sources.

19. The light system of claim 16, wherein some the one or more locator recesses are primary locator recesses that extend in a first direction within to a plane of the two or more printed circuit boards and some of the one or more locator recesses are secondary locator recesses that extend in a second direction that is orthogonal to the first direction and wherein the primary locator recesses receive primary locators and the secondary recesses locate secondary locators that align the light aiming devices, the printed circuit board, or a combination thereof relative to each other.

* * * * *